United States Patent [19]
Ebrahim

[11] Patent Number: 5,893,165
[45] Date of Patent: Apr. 6, 1999

[54] SYSTEM AND METHOD FOR PARALLEL EXECUTION OF MEMORY TRANSACTIONS USING MULTIPLE MEMORY MODELS, INCLUDING SSO, TSO, PSO AND RMO

[75] Inventor: Zahir Ebrahim, Mountain View, Calif.

[73] Assignee: Sun Microsystems, Inc., Mountain View, Calif.

[21] Appl. No.: 671,305

[22] Filed: Jul. 1, 1996

[51] Int. Cl.⁶ .................................................. G06F 12/00
[52] U.S. Cl. .......................... 711/158; 711/144; 395/860
[58] Field of Search ............................ 395/860; 711/127, 711/144, 158, 167

[56] References Cited

U.S. PATENT DOCUMENTS

| | | | |
|---|---|---|---|
| 4,126,893 | 11/1978 | Cronshaw et al. ....................... | 395/860 |
| 4,228,503 | 10/1980 | Waite et al. . | |
| 5,036,459 | 7/1991 | den Haan et al. . | |
| 5,319,753 | 6/1994 | MacKenna et al. . | |
| 5,428,799 | 6/1995 | Woods et al. . | |
| 5,655,100 | 8/1997 | Ebrahim .................................. | 711/144 |

FOREIGN PATENT DOCUMENTS

| | | |
|---|---|---|
| 0 317 481A3 | 5/1989 | European Pat. Off. . |
| 0 380 842A2 | 8/1990 | European Pat. Off. . |
| 0 468 831A2 | 1/1992 | European Pat. Off. . |
| 0 507 571A3 | 10/1992 | European Pat. Off. . |
| 0 537 899A1 | 4/1993 | European Pat. Off. . |
| 0 598 535A1 | 5/1994 | European Pat. Off. . |
| 0 644 489A3 | 3/1995 | European Pat. Off. . |
| 9730 4264 | 7/1998 | European Pat. Off. . |
| US89/02721 | 1/1990 | WIPO . |
| WO93/00638 | 1/1993 | WIPO . |

OTHER PUBLICATIONS

"Rochester's Intelligent Gateway"; K.A. Lantz et al.; IEEE, vol. 15, No. 10, Oct. 1982; pp. 54–68.

"An approach to the design of distributed real–time operating systems"; Cvijovic et al.; Microprocessors and Microsystems; vol. 16, No. 2; 1992; pp. 81–89.

"A Second–Level Cache Controller for A Super–Scalar SPARC Procesor"; Chang et al.; 37th IEEE CompCon Conference; Feb. 24–28, 1992; pp. 142–151.

"The SPARC Architecture Manual"; Version 9; SPARC International, Inc., Menlo Park, California; 1994; 8 Memory Models; pp. 117–129 & pp. 256–262.

Gharachorloo, K., et al., "Programming for Different Memory Consistency Models", Journal of Parallel and Distributed Computing, vol. 15, No. 4, 1 Aug. 1991, Duluth, US, pp. 399–407.

*Primary Examiner*—John W. Cabeca
*Assistant Examiner*—David Langjahr
*Attorney, Agent, or Firm*—Gary S. Williams; Flehr Hohbach Test Albritton & Herbert LLP

[57] ABSTRACT

A data processor supports the use of multiple memory models by computer programs. At a device external to a data processor, such as a memory controller, memory transactions requests are received from the data processor. Each memory transaction request has associated therewith a memory model selected from a predefined plurality of memory models. In a preferred embodiment, the predefined memory models supported are SSO (strong sequential order), TSO (total store order), PSO (partial store order) and RMO (relaxed memory order). Data representing pending memory transactions are stored in one or more pending transaction buffers and a pending transaction status array. The pending transaction status data includes memory transaction order data that indicates which of the pending memory transactions can be performed before other ones of the pending memory transactions. More particularly, logic in the memory controller determines, based on the memory model associated with a most recently received memory transaction request and the memory model associated with at least one other pending memory transaction, whether or not the memory transaction associated with the most recently received memory transaction request can be performed before the other pending memory transaction, and then stores data representing this ordering determination in a transaction scoreboard. The memory controller performs the pending memory transactions in an order consistent with the memory transaction order data. As a result, a subset of the pending memory transactions are performed in a different order than they were received from the data processor.

18 Claims, 6 Drawing Sheets

SYSTEM AND METHOD FOR PARALLEL EXECUTION OF MEMORY TRANSACTIONS USING MULTIPLE MEMORY MODELS, INCLUDING SSO, TSO, PSO AND RMO

The present invention relates to computer systems using memory controllers to govern access to memory and that execute memory transactions having varying memory access ordering requirements, and particularly to a system in which a memory controller reorders and performs in parallel memory transactions in a manner consistent with the memory access ordering requirements of each memory transaction that is exported to the memory controller.

BACKGROUND OF THE INVENTION

Definitions

The term "interconnect" is herein defined to mean the circuitry and data paths between a data processor and the memory resources used by the data processor. The interconnect may also connect a data processor to various input/output channels as well as to memory resources.

The term "strongly ordered," as in "strongly ordered transactions," is herein defined to mean that transactions must be executed in the same order as specified in the program instruction stream.

The term "performing memory transactions in parallel" refers to the fact that in many computer system some memory transactions can be performed in parallel, during overlapping time periods, using parallel memory transaction paths available in the interconnect.

The term "parallelism" in the context of this document refers to the performance of memory transactions in parallel, during overlapping time periods, using parallel memory transaction paths available in the interconnect; it does not refer to the parallel execution of instructions by a data processor except to the extent that programs instructions are incidentally performed in parallel via the parallel execution of their associated memory transactions.

A memory transaction is one of the following:
  Store: a request by a processor to replace the value of a specified memory location. The address and new value are bound to the store transaction when the processor initiates the store transaction. A store is complete when the new value is visible to all processors in the system (globally visible).
  Load: a request by a processor to retrieve the value of a specified memory location. The address is bound to the load transaction when the processor initiates the load transaction. A load is complete when the value being returned cannot be modified by a store made by another processor.
  Atomic: a load/store pair with the guarantee that no other memory transaction will alter the state of the memory between the load and the store. An atomic transaction is considered to be both a load and a store.
  Flush: a request by a processor to force changes in the data space aliased to the instruction space to be consistent. Flush transactions are considered to be store operations for memory model purposes.
  Interrupt: a cross-call transaction from one processor directly to another processor. Interrupt transactions are considered to be like store operations for memory model purposes.
  Prefetch: is considered to be a load operation for the memory model purposes.

"Program order" is a per-processor order that denotes the sequence in which processor n logically executed instructions. Memory transactions A and B are said to be in program order if and only if memory transaction A is caused by an instruction that is executed before the instruction that caused memory transaction B.

The term "memory transaction ordering model," usually shortened for conciseness to "memory model," is herein defined to mean a set of rules that define the extent to which memory transactions may be executed in a different order from the order in which they were generated. The following are definitions of four memory models from the point of view of the interconnect.

RMO (relaxed memory order). In programs and program segments using RMO, there are no ordering restrictions on any transaction issued to the interconnect beyond those required for processor self-consistency.
  PSO (partial store order). In programs and program segments using PSO, loads are blocking with respect to all subsequent memory transactions and are ordered with respect to earlier loads. Atomic transactions are ordered with respect to load transactions (i.e., atomic transactions and load transactions cannot bypass each other). Stores can bypass other stores, but a later store cannot bypass an earlier a load transaction. From another viewpoint, the specification for PSO is that of RMO with the additional requirement that all memory transactions with load semantics (including loads and atomic transactions) are followed by an implied Membar LoadLoad LoadStore.
  TSO (total store order). In programs and program segments using TSO, stores do not bypass stores, and loads are blocking to subsequent stores and loads and do not bypass loads. Stores must not bypass prior loads, although loads may bypass prior stores. Atomic transactions are blocking to subsequent transactions. From another viewpoint, the specification for TSO is that of PSO with the additional requirement that all memory transactions with store semantics (including stores and atomic transactions) are followed by an implied Membar StoreStore.
  SSO (strong sequential order). SSO is normally required for accessing I/O devices. SSO is also used in programs that assume sequentially consistent hardware. The transaction issue order, completion order, and program order, are all the same. Loads and stores in program order do not bypass each other either in the processor or in the interconnect.

The terms "synchronization commands" and "membar" instructions both refer to instructions used for ensuring that some or all types of memory transactions prior a synchronization point are completed before execution of the memory transactions after the synchronization point. For the purposes of this document, five types of membar instructions are defined:
  membar memsync: all memory transaction instructions (of all types) before this membar instruction must be completed prior to execution of any memory transaction instructions after this membar instruction.
  membar store-store: all store instructions before this membar instruction must be completed prior to execution of any store instructions after this membar instruction.
  membar load-load: all load instructions before this membar instruction must be completed prior to execution of any load instructions after this membar instruction.

membar store-load: all store instructions before this membar instruction must be completed prior to execution of any load instructions after this membar instruction.

membar load-store: all load instructions before this membar instruction must be completed prior to execution of any store instructions after this membar instruction.

When using the RMO model, any ordering requirements between two transactions are enforced by issuing the appropriate membar instruction(s). When using the TSO model, load transactions are implicitly followed by a "membar load-load" instruction and a "membar load-store" instruction, and store transactions are implicitly followed by a "membar store-store" instruction.

Use of Memory Models within Data Processors

It is well known, within the context of a data processor (sometimes called a CPU) processing various transactions and determining the order in which to export memory access requests (stores and loads) to locations outside its own cache memory, that the data processor may export memory access requests in a different order from the program execution order in which they were generated if (A) the data processor knows from the type of transactions being executed that reordering the memory access requests will not cause an error, and (B) reordering the exported memory access requests may improve the system's speed of operation by allowing various memory access transactions to be performed in parallel.

In large scalable systems, as well as in high performance multiprocessor systems, the software being executed may utilize a number of different predefined memory models. Four such memory models are defined above. The programmers who design such software may attempt to speed program execution by utilizing program instructions that implicitly or explicitly use various memory models. That is, at least some of the instructions in a program may specify a memory model that enables some of the memory transactions associated with the program to be performed in parallel. A programmer can attempt to parallelize the execution of memory transactions in a program by not requiring strong sequential consistency at every point in the program, but explicitly specifying "points of synchronization" at meaningful points in the program. Such points of synchronization require that some or all types of memory transactions prior to the synchronization point be completed before execution of the memory transactions after the synchronization point.

The use of multiple memory models, or the use of a relaxed memory model in combination with membar instructions, in theory, allows the programmer to specify or enable more parallelism in a program than might otherwise be possible. Data processors, however, have generally not provided memory model information to the interconnect. In fact, most data processors expect all memory access transactions issued by them to be strongly ordered. As a result, in such data processors memory transactions are not reordered by the interconnect, although the data processors may internally change the order in which memory transactions are presented to the interconnect to be different from the order in which the corresponding memory transaction requests were generated by program instructions.

The PowerPC microprocessor goes the other way. It assumes the weakest memory model (RMO, which is defined above) and allows the interconnect to parallelize all transactions. Thus the PowerPC puts the burden on the programmer to make sure that all programs, both application and system software such as device drivers, have appropriate memory synchronization commands. Programs that assume stronger memory models from the hardware will not execute correctly on the PowerPC without the inclusion of numerous synchronization commands. In general, there is much more software in commercial use as of 1996 that assumes that the interconnect uses strong memory models such as SSO and TSO, than there is software that assumes the interconnect uses weaker memory models such as PSO and RMO.

Some data processors support a multiplicity of memory models inside the processor. For instance, the SPARC processors support all of SSO, TSO, PSO and RMO. This enables such data processors to reorder memory transactions to and from cache memory. However, these data processors do not provide memory model information to the interconnect. As a result, the data processor's interconnect must support a single memory model, which for SPARC processors has historically been SSO at the interconnect interface for memory references. Input/output transactions are delineated in the SPARC processors by separate non-cached transactions and are performed by the interconnect using only the SSO model. Thus, in such systems there is no flexibility or opportunity to parallelize memory transactions when the internal memory models utilized by executing programs are weaker (i.e., allow more parallelism) than the single memory model implemented by the interconnect. This becomes even more significant in NUMA architectures where memory may be arbitrarily far away and connected by an interconnection network. In such cases there are greater opportunities to parallelize transactions through the interconnection network if memory model information is made available to the interconnection network controller.

SUMMARY OF THE INVENTION

In a computer system having a data processor that supports the use of multiple memory transaction ordering models (memory models) by computer programs, memory transactions are managed as follows. At a device external to a data processor, such as a memory and interconnect controller, memory transactions requests are received from the data processor. Each memory transaction request has associated therewith a memory model selected from a predefined plurality of memory models. In a preferred embodiment, the predefined memory models supported are SSO (strong sequential order), TSO (total store order), PSO (partial store order) and RMO (relaxed memory order).

Data representing pending memory transactions are stored in one or more pending transaction buffers and a pending transaction status array. The pending transaction status data includes memory transaction order data that indicates which of the pending memory transactions can be performed before other ones of the pending memory transactions. More particularly, logic in the memory controller determines, based on the memory model associated with a most recently received memory transaction request and the memory model associated with at least one other pending memory transaction, whether or not the memory transaction associated with the most recently received memory transaction request can be performed before the other pending memory transaction, and then stores data representing this ordering determination in a transaction scoreboard.

The memory controller performs the pending memory transactions in an order consistent with the memory transaction order data. As a result, a subset of the pending memory transactions are performed in a different order than they were received from the data processor.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

Figure 1:
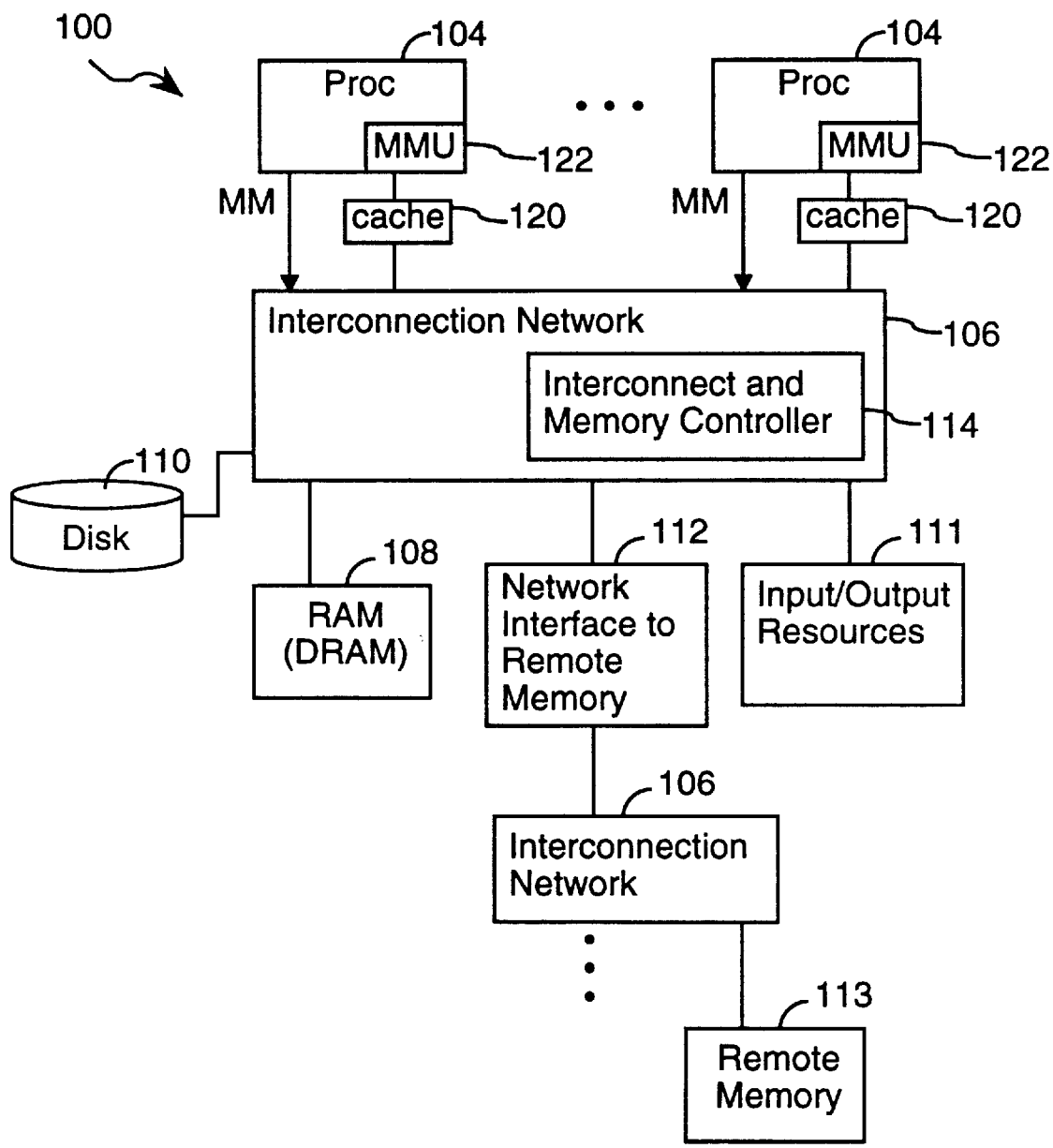
FIG. 1 is a block diagram of a computer system incorporating an embodiment of the present invention.

Referring to FIG. 1, there is shown a computer system 100 that includes a cluster of processors 104. The processors 104 are coupled via an interconnection network 106 to a primary memory (random access memory) 108, secondary memory 110 (non-volatile memory such as magnetic disk storage), and input/output resources 111. A network interface 112 may provide access to remotely located memory 113 associated with other processor clusters. Access to the primary memory 108, secondary memory 110, input/output resources 111, and remotely located memory 113 is governed by an interconnect and memory controller 114. Other clusters of processors 104 share access to the remotely located memory 113 and to this cluster's local memory resources via their own interconnection networks 106.

For the purposes of this document, "memory controller" refers to any and all control logic outside the data processor that receives cache miss transactions from the data processor. This may include an interconnect controller, remote memory controller, I/O controller, and so on.

Each processor 104 in the cluster includes its own local cache memory 120 that may be kept coherent (i.e., consistent) with the contents stored in the cache memories of the other processors in the system, depending on the type of shared memory architecture implemented. Each processor 104 also includes a memory management unit 122 that includes a translation lookaside buffer (TLB) for converting virtual addresses, used by processes executed by the data processor 104, into physical addresses corresponding to memory locations in the various memory units 108, 110.

If a copy of the data in the resulting primary physical memory address is stored in cache memory 120, then the processor 104 accesses the addressed data directly in its cache memory 120. If the addressed data is not in cache memory 120, the interconnect and memory controller 114 retrieves the addressed data from primary memory 108, secondary memory 110, or remote memory 112 and stores it in the cache memory 120. In the case of data retrieved from secondary memory 110 (DMA from disk) or remote memory 113 (such as in COMA and simple COMA architectures), a full page of data is typically copied first into primary memory 108 under software control and then a smaller block of data, called a cache line, is copied from there into the cache memory 120. In NUMA architectures the data may be fetched directly into the cache memory 120 from the remote memory 113. Then the processor 104 accesses the addressed data from its cache memory 120.

In a preferred embodiment of the present invention, each memory transaction (i.e., a load, store or atomic memory transaction) sent to the interconnect and memory controller 114 has an associated 2-bit memory model value MM[1:0], the values of which are: 11 for SSO, 10 for TSO, 01 for PSO, and 00 for RMO. All memory transactions in the ISA (instruction set architecture) of the processor are mapped to one of these categories of transactions: load, store and atomic. For example, an "interrupt send" is mapped to the "store" transaction category, a "block store" is mapped to the "store" transaction category, a prefetch is mapped to the "load" transaction category, and so on.

Memory model information may be specified in these mappings as well. For instance, a prefetch load may be issued with memory model RMO. An Interrupt may be issued either with (A) memory model SSO, especially if it must be ordered behind a prior store operation to memory, or (B) memory model RMO, if there is no dependency on prior memory operations. This is applicable even when interrupt transactions use a dedicated transaction type on the interconnect because the memory model bits MM specify ordering constraints on the interrupt transactions so as to enable the use of more parallelism when appropriate.

The MM[1:0] bits may be provided by either a processor state register, or from the page table entry used by the MMU 122 to translate the address associated with the memory transaction into a physical address (i.e., in some implementations of the present invention the memory model property may be marked on a per page basis in the page tables used by the MMU). Including the MM (memory model) value in the memory transaction request sent to the interconnect (i.e., to the interconnect and memory controller 114) enables the interconnect and memory controller 114 to keep track of which transaction was issued under which memory model when there are multiple outstanding transactions from a data processor. This also allows the controller 114 to parallelize memory transactions issued under weaker memory models, when parallel transaction processing is available, and to ensure strong ordering for transactions issued under stronger memory models.

The overall latency of completing multiple outstanding memory transactions is often significantly reduced when some of the transactions can be executed out of order so as to maximize parallelism (i.e., so as to use parallel memory transaction paths whenever possible). This also improves overall throughput of the interconnect.

Encoding the memory model of the processor along with each memory transaction exported to the interconnect in a concise, uniform and efficient way enables the use of parallel memory transactions paths as applicable for each of the memory models, and also allows for efficient pipelining for memory transactions that must be executed in sequential order.

Figure 2:
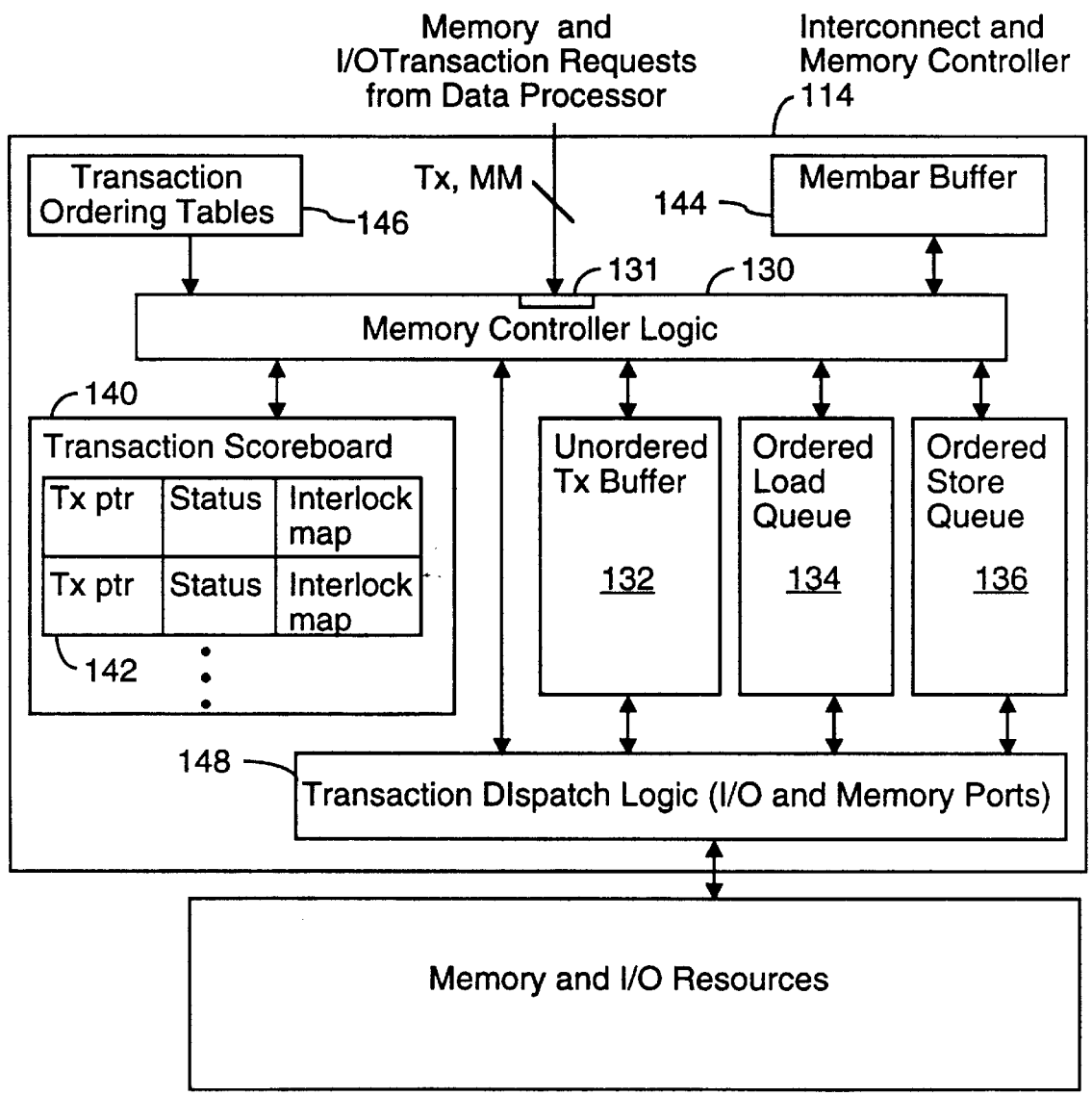
FIG. 2 is a block diagram of a memory controller in accordance with an embodiment of the present invention.

Referring to FIG. 2, the interconnect and memory controller 114 includes memory controller logic 130, which includes a number of state machines for keeping track of pending memory transactions, determining interlocks between pending transactions, and managing the performance of the transactions. Memory transaction requests are received at a memory transaction interface or port 131 and then stored in one of several buffers 132, 134, 136 that are used for storing pending unordered transactions, ordered load transactions, and ordered store transactions, respectively. Alternately all pending memory transactions may be stored in a single buffer.

Status information about all the pending memory transactions are stored in a transaction scoreboard 140, some parts of which will be described in more detail below. Basically, though, the transaction scoreboard 140 stores one record 142 for each pending memory transaction. The records are arranged in the same order as they are received from the data processor. Each record includes a pointer to the buffer location where the transaction request is stored, status information, and transaction interlock information called an Interlock Map.

In a preferred embodiment, when the data processor executes a membar instruction, that instruction is passed to the interconnect and memory controller 114, which then stores a representation of the membar instruction in a membar buffer 144. In particular, the membar buffer 144 includes a record corresponding to each record 142 of the transaction scoreboard 140. The data stored in each membar record indicates what types of transactions cannot occur before the corresponding pending transactions due to the execution of membar synchronization instructions by the data processor. The membar transaction ordering constraints supplement or override the memory transaction ordering constraints associated with the various memory models.

The memory transaction ordering constraints associated with the various memory models are represented by a set of transaction ordering tables 146. Each table 146 can be thought of as a four dimensional table whose axes are TXT1 (the transaction type of the preceding transaction), MM1 (the memory model associated with the preceding transaction), TXT2 (the transaction type of a next transaction), and MM2 (the memory model associated with the next transaction). For reasons that will be explained below, in one embodiment the interconnect and memory controller 114 stores N copies of the transaction ordering table 146, where N is the maximum extent of transaction re-ordering that is allowed (e.g., if N is equal to 3 then a transaction can be re-ordered, at most, with respect to the three immediately preceding memory transactions).

Portions of the transaction ordering table 146 are shown in Tables 1–4. In each of these tables, the row heading indicates the transaction type and memory model of the preceding transaction and the column heading indicates the transaction type and memory model of the succeeding transaction. The table entries, each equal to "M" or "P", are defined as follows:

P: execute the two memory transactions in program issue order (i.e., in the same order as they were received by the memory controller).

M: execute the two memory transactions in any order.

TABLE 1

| | \multicolumn{6}{c}{TSO and SSO} | | | | | |
|---|---|---|---|---|---|---|
| | Load1 TSO | Store1 TSO | Atomic1 TSO | Load1 SSO | Store1 SSO | Atomic1 SSO |
| Load2 TSO | P | M | P | P | P | P |
| Store2 TSO | P | P | P | P | P | P |
| Atomic2 TSO | P | P | P | P | P | P |
| Load2 | P | P | P | P | P | P |

TABLE 1-continued

| | \multicolumn{6}{c}{TSO and SSO} | | | | | |
|---|---|---|---|---|---|---|
| | Load1 TSO | Store1 TSO | Atomic1 TSO | Load1 SSO | Store1 SSO | Atomic1 SSO |
| SSO | | | | | | |
| Store2 SSO | P | P | P | P | P | P |
| Atomic2 SSO | P | P | P | P | P | P |

TABLE 2

| | \multicolumn{6}{c}{RMO and SSO} | | | | | |
|---|---|---|---|---|---|---|
| | Load1 RMO | Store1 RMO | Atomic1 RMO | Load1 SSO | Store1 SSO | Atomic1 SSO |
| Load2 RMO | M | M | M | P | P | P |
| Store2 RMO | M | M | M | P | P | P |
| Atomic2 RMO | M | M | M | P | P | P |
| Load2 SSO | P | P | P | P | P | P |
| Store2 SSO | P | P | P | P | P | P |
| Atomic2 SSO | P | P | P | P | P | P |

TABLE 3

| | \multicolumn{6}{c}{RMO and TSO} | | | | | |
|---|---|---|---|---|---|---|
| | Load1 RMO | Store1 RMO | Atomic1 RMO | Load1 TSO | Store1 TSO | Atomic1 TSO |
| Load2 RMO | M | M | M | P | M | P |
| Store2 RMO | M | M | M | P | P | P |
| Atomic2 RMO | M | M | M | P | P | P |
| Load2 TSO | P | M | P | P | M | P |
| Store2 TSO | P | P | P | P | P | P |
| Atomic2 TSO | P | P | P | P | P | P |

TABLE 4

| | \multicolumn{6}{c}{PSO and SSO} | | | | | |
|---|---|---|---|---|---|---|
| | Load1 PSO | Store1 PSO | Atomic1 PSO | Load1 SSO | Store1 SSO | Atomic1 SSO |
| Load2 PSO | P | M | P | P | P | P |
| Store2 PSO | P | M | P | P | P | P |
| Atomic2 PSO | P | P | P | P | P | P |
| Load2 SSO | P | P | P | P | P | P |
| Store2 SSO | P | P | P | P | P | P |
| Atomic2 SSO | P | P | P | P | P | P |

The memory transaction model "behaviors" represented by the ordering constraints in the transaction ordering table 146 are somewhat arbitrary. However, once the ordering constraints associated with the transaction ordering table 146 have been chosen or specified, they are similar to a contract between the computer system and the programmer. The programmer uses that contract to determine where membar instructions (also called fence, barrier or synchronization instructions) must be inserted to enforce any memory transactions ordering requirements associated with the tasks being performed by a particular program.

The use of a transaction ordering table 146 as the basis for determining what input/output and memory transactions can be reordered or parallelized provides flexibility in that the transaction ordering table 146 can be easily expanded to handle new memory models, and also because the transaction ordering table 146 can be easily modified (by replacing selected "P" entries with "M" and/or vice versa) to accommodate changes in the definitions of the memory models.

The memory controller also includes transaction dispatch logic 148, which is the logic circuitry for selecting a pending transaction, if any, to perform for each memory resource that is ready to accept another memory transaction.

EXAMPLE

FIGS. 3–7 represent an exemplary implementation of the present invention. Other implementations could provide even greater parallelism between transactions.

Interlock Determination Logic for

Generating the Interlock Map for a Received Transaction

Figure 3:
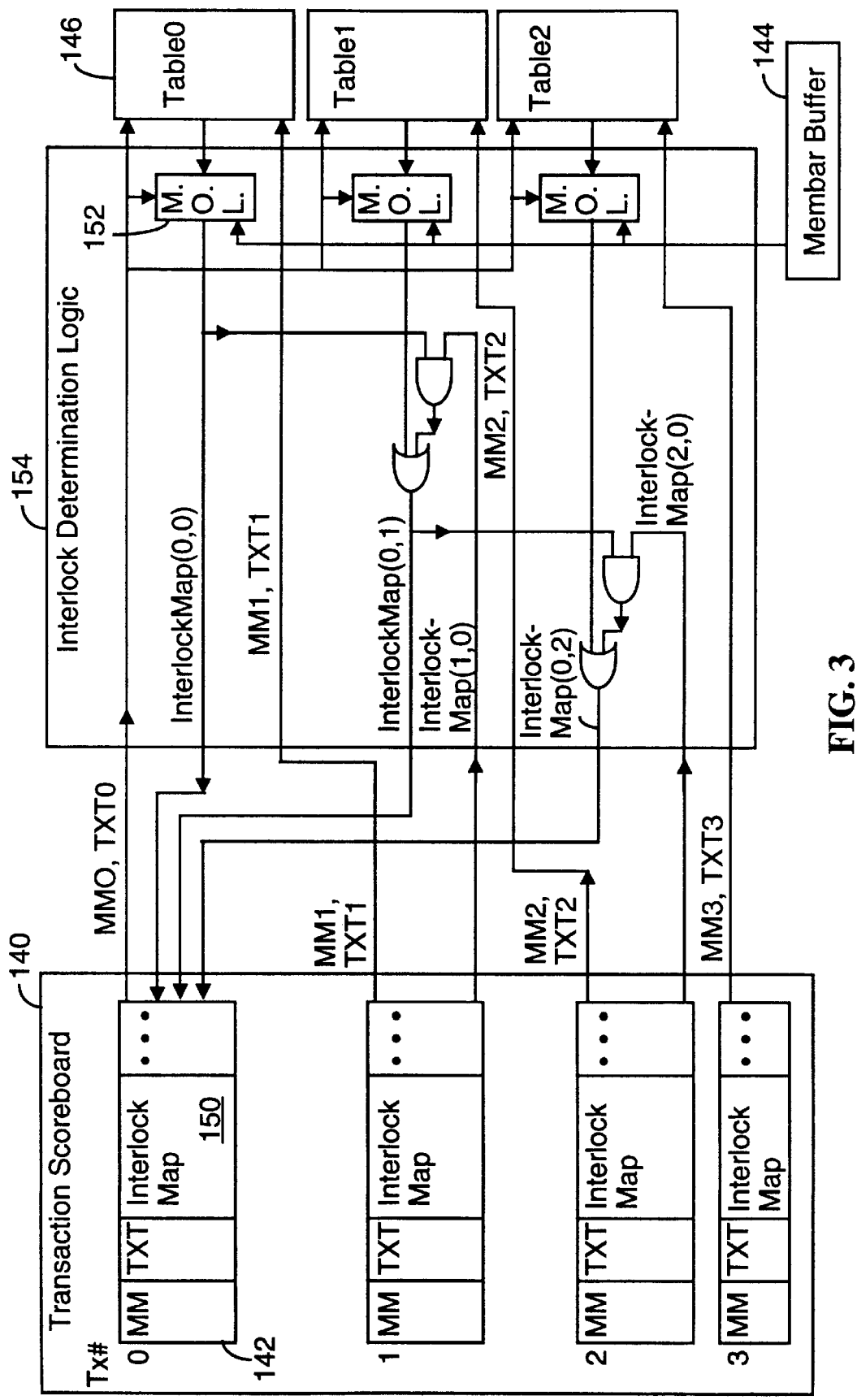
FIG. 3 is a block diagram of a portion of the transaction scoreboard and memory controller logic used in an embodiment of the present invention.

Referring to FIG. 3, for the purposes of explaining the operation of the interconnect and memory controller 114, we will describe a controller 114 that can store up to seven pending memory transactions per data processor, that can reorder a memory transaction with respect to transactions received up to three transactions prior to that transaction, and that utilizes three parallel memory transaction paths for executing transaction. In other embodiments the maximum number of stored transactions, the depth of transaction reordering and the number of distinct memory resources may differ from these design choices.

As shown in FIG. 3, each transaction scoreboard record 142 stores the memory model (MM) for an associated transaction, the transaction type (TXT) (i.e., load, store or atomic), and an Interlock Map 150 that indicates ordering constraints with respect to the three immediately preceding transactions.

The three bits of the Interlock Map for each pending transaction are defined as follows. InterlockMap(i,0) is equal to 1 if the ith pending transaction cannot be reordered with respect to its immediately preceding transaction, and is equal to 0 if the ith pending transaction can be reordered with respect to its immediately preceding transaction. Similarly, InterlockMap(i,1) is equal to 1 if the ith pending transaction cannot be reordered with respect to the second transaction before the ith transaction (i.e., the transaction represented by the i+2th entry in the transaction scoreboard), and is equal to 0 if the ith pending transaction can be reordered with respect to the second transaction before the ith transaction. Finally, InterlockMap(i,2) is equal to 1 if the ith pending transaction cannot be reordered with respect to the third transaction before the ith transaction (i.e., the transaction represented by the i+3th entry in the transaction scoreboard), and is equal to 0 if the ith pending transaction can be reordered with respect to the third transaction before the ith transaction.

Ignoring the membar override logic (MOL) 152 for the moment, InterlockMap(0,0) is generated by interlock determination logic 154 (which is a part of the memory controller logic 130) simply by looking up the entry in the transaction ordering table 146 corresponding to the current transaction and the preceding transaction. That is, an ordering constraint is generated as a function of the memory model and transaction type (MM0, TXT0) of the current transaction and those (MM1, TXT1) of the preceding transaction. If the table entry is equal to "P" then a logical "1" is output, meaning that the transactions must be sequentially ordered. Otherwise a "0" is output, meaning that these two transactions can be performed in parallel or in the opposite order from which they were received.

InterlockMap(0,1) is generated by checking the transaction ordering table 146 to see if there is a sequential ordering requirement between the current transaction and the transaction received two transactions before the current transaction. Even if there is no sequential ordering requirement between these two transactions based on their transaction types and memory models, there is an indirect sequential ordering requirement between these two transactions if (A) there is a sequential ordering requirement between the current transaction and the immediately preceding transaction and (B) there is also a sequential ordering requirement between the preceding transaction and the transaction immediately before it. This indirect sequential ordering requirement is called transitivity.

InterlockMap(0,2) is generated by checking the transaction ordering table 146 to see if there is a sequential ordering requirement between the current transaction and the transaction received three transactions before the current transaction. Even if there is no sequential ordering requirement between these two transactions based on their transaction types and memory model, there is an indirect sequential ordering requirement between these two transactions if (A) there is a sequential ordering requirement between the current transaction and the transaction two transactions before the current transaction, and (B) there is also a sequential ordering requirement between the transaction two transactions ago and the transaction immediately before it.

The boolean logic expressions for the three Interlock Map values, excluding the operation of the membar override logic 152, are:

InterlockMap(0,0)=Table0 (MM0, MM1, TX0, TX1)

InterlockMap(0,1)=Table1 (MM0, MM2, TX0, TX2) OR (InterlockMap(0,0) AND InterlockMap(1,0))

InterlockMap(0,2)=Table2 (MM0, MM3, TX0, TX3) OR (InterlockMap(0,1) AND InterlockMap(2,0))

Table0, Table1 and Table2 are identical copies of the transaction ordering table 146. By providing parallel copies of the table 146, the computation of all the Interlock Map values can be completed in a single state machine clock cycle.

The membar override logic 152 works as follows. If a membar instruction is exported by the data processor to the interconnect after the ith memory transaction (i.e, the transaction represented by the ith entry in the transaction scoreboard), then the memory controller logic stores a corresponding membar record in an ith entry of the membar buffer 144, and also stores membar records for each pending prior transaction. Each membar buffer record can have three entries, and example of which is shown in Table 5.

TABLE 5

Membar Record for Membar Load-Load that follows a Load Transaction
(i.e, the corresponding transaction is a load transaction)

|  | Load | Store | Atomic |
|---|---|---|---|
| Override: | 1 (Y) | 0 (N) | 1 (Y) |

If a membar instruction is not exported to the interconnect after a memory transaction, the corresponding membar record is set to all zeros. If a membar instruction is exported to the interconnect after a memory transaction, the corresponding membar records (i.e., for the current transaction and the pending prior transactions) are set to 1 for each type of succeeding transaction (i.e., load, store or atomic) that must not be performed before the current transaction is completed. Since all pending membar constraints are applied together (i.e., cumulatively), the membar constraint values for the most recently received transaction request may be generated by logically ORing the membar constraint values generated for the immediately preceding received transaction with any new membar constraints received from the data processor.

If the membar override logic 152 receives a "1" from the membar buffer 144 for a particular Interlock Map value, then that Interlock Map value is set to "1", meaning that a sequential ordering constraint or interlock is imposed. If the membar override logic 152 receives a "0" from the membar buffer 144 for a particular Interlock Map value, then that Interlock Map value is set to the value received from the transaction ordering table 146.

Figure 4:
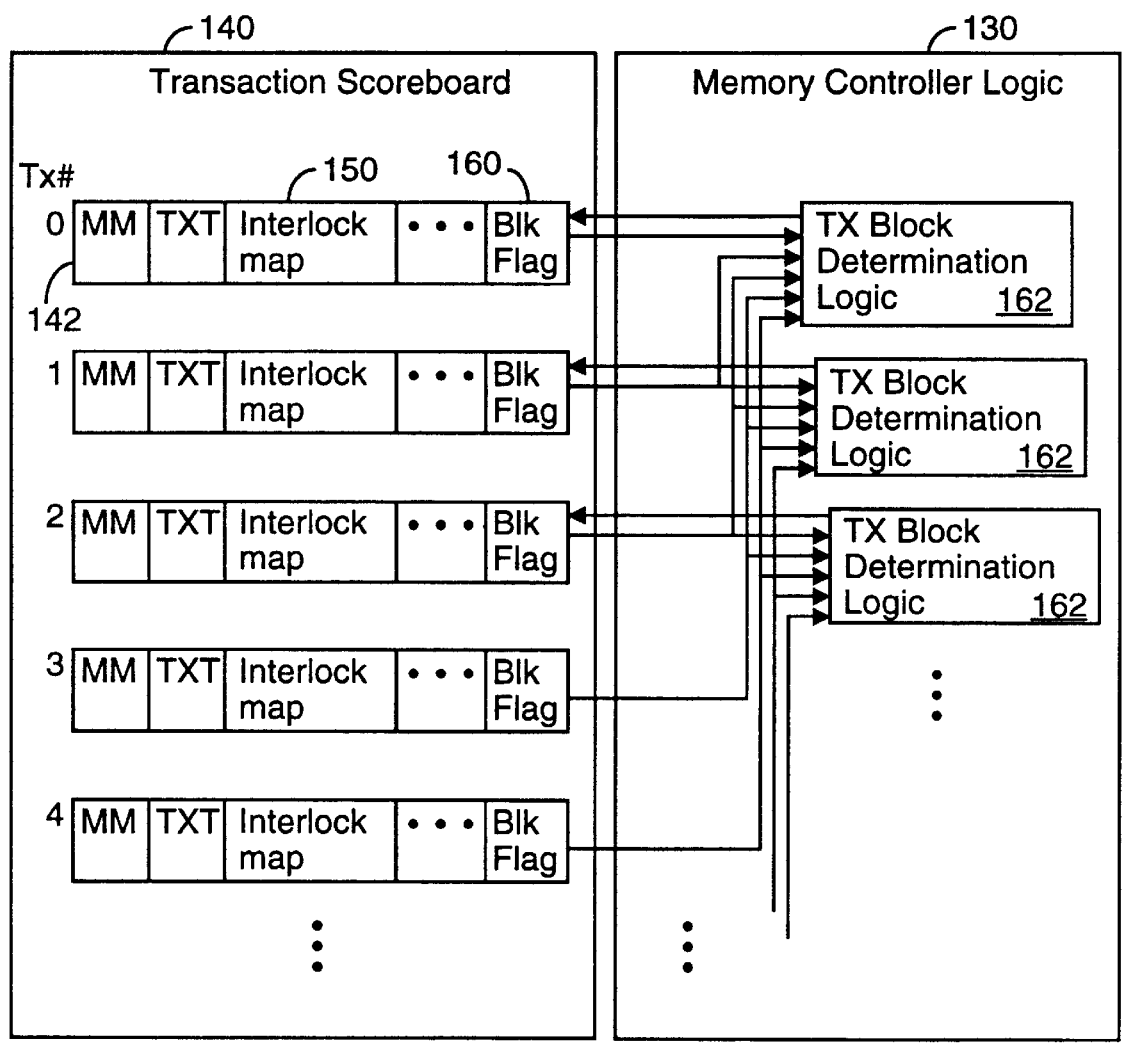
FIG. 4 is a block diagram of another portion of the transaction scoreboard and memory controller logic used in an embodiment of the present invention.

Referring to FIG. 4, the transaction scoreboard record 142 for each pending transaction includes a "Block flag" 160 indicating whether or not performance of the transaction is blocked because of sequential ordering requirements. In particular, for every record 142 of the transaction scoreboard 140 there is a corresponding transaction block determination logic circuit 162. The Block flag is set to "1", indicating a pending transaction is blocked if (A) the pending transaction's Interlock Map indicates a sequential ordering requirement for any transaction that has not yet been completed, or (B) if there is any pending transaction that predates the pending transaction by more than three transactions (i.e., by more than the number of transactions for which there are Interlock Map entries). The Block flags 160 are automatically recomputed every time any memory transaction is completed because the completion of a transaction may unblock other pending transactions.

Figure 5:
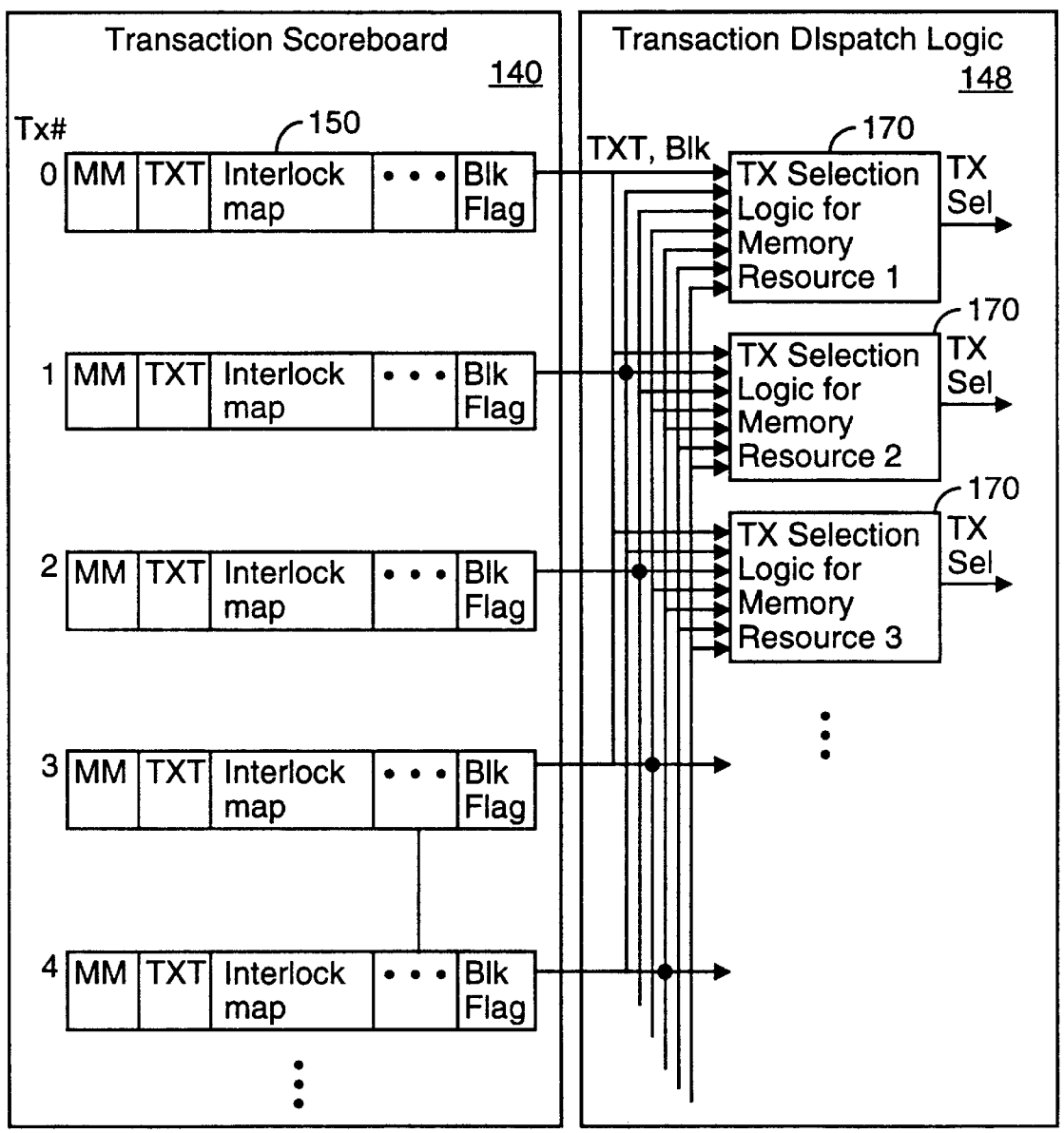
FIG. 5 is a block diagram of a portion of the transaction scoreboard a transaction dispatch logic used in an embodiment of the present invention.

Referring to FIG. 5, the transaction dispatch logic 148 includes a transaction selection logic circuit 170 for each distinct memory resource or memory transaction path. The function of the transaction selection logic circuit 170 is to select the oldest pending transaction that is appropriate for the corresponding memory resource. Thus, if there were two separate memory resources including one for load transaction and one for store and atomic transactions, then the transaction selection logic circuit 170 for the store path would select the oldest pending store or atomic transaction but would not select any pending load transaction.

The transaction block determination logic circuit 162 and transaction selection logic circuit 170 together implement a set of transaction activation rules. The transaction activation rules indicate which pending transactions are blocked and thus are not yet eligible for activation, which pending transactions are unblocked and thus are eligible for activation, and which unblock pending transactions to activate. Active transactions (also called activated transactions) are those that are in the process of being performed.

Figure 6:
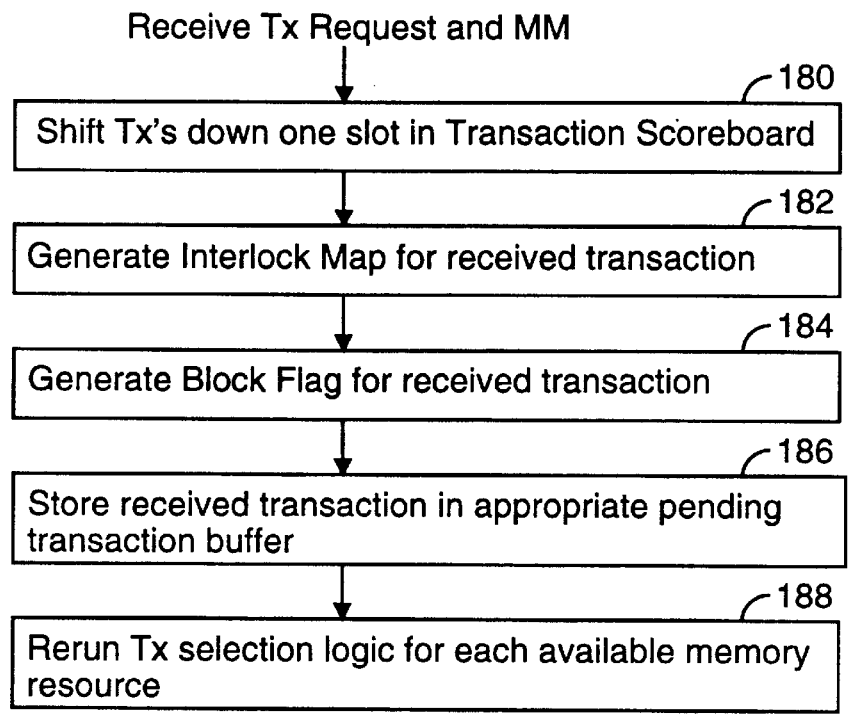
FIG. 6 is a flow chart of the operation of the memory controller, in response to the receipt of a memory transaction request from a data processor, in an embodiment of the present invention.

Referring to FIG. 6, there is shown a flow chart representing the operation of a state machine in the interconnect and memory controller 114 that is used to handle memory transaction requests exported by the data processor to the interconnect. Each step of the flow chart represents a successive state of the state machine. At step 180 all the entries in the transaction scoreboard are shifted down one slot. Thus, the entry in position 0 is shifted to position 1, and so on. Alternately, if the transaction scoreboard is used as a circular buffer, then the pointer to the topmost position is updated. For purposes of explaining the operation of the transaction scoreboard it will be assumed that transaction records are shifted at step 180. Next (step 182) the Interlock Map for the received transaction is generated using the logic circuitry shown in FIG. 3 and is stored in the transaction scoreboard record for the received transaction, which is assumed here to be the 0th entry of the transaction scoreboard. Next, the Block flag for the received transaction is computed using the circuitry shown in FIG. 4 and is stored in the transaction scoreboard record for the received transaction (step 184). The Block flag indicates whether or not execution of the received transaction is blocked by sequential ordering requirements. Based on the sequential ordering requirements, or lack thereof, applicable to the received transaction, it is stored in an appropriate one of the transaction buffers and a pointer to the stored transaction is stored in the corresponding transaction scoreboard record (step 186). Finally, transaction selections are computed for any memory resources that are available for use (step 188) to see if the received transaction can be serviced immediately.

If there are no pending transactions, an incoming transaction is immediately activated. Optimization for such fast path transaction handling can enable simultaneously kicking off the memory transaction while the scoreboard and membar values for the transaction are being generated and stored.

Figure 7:
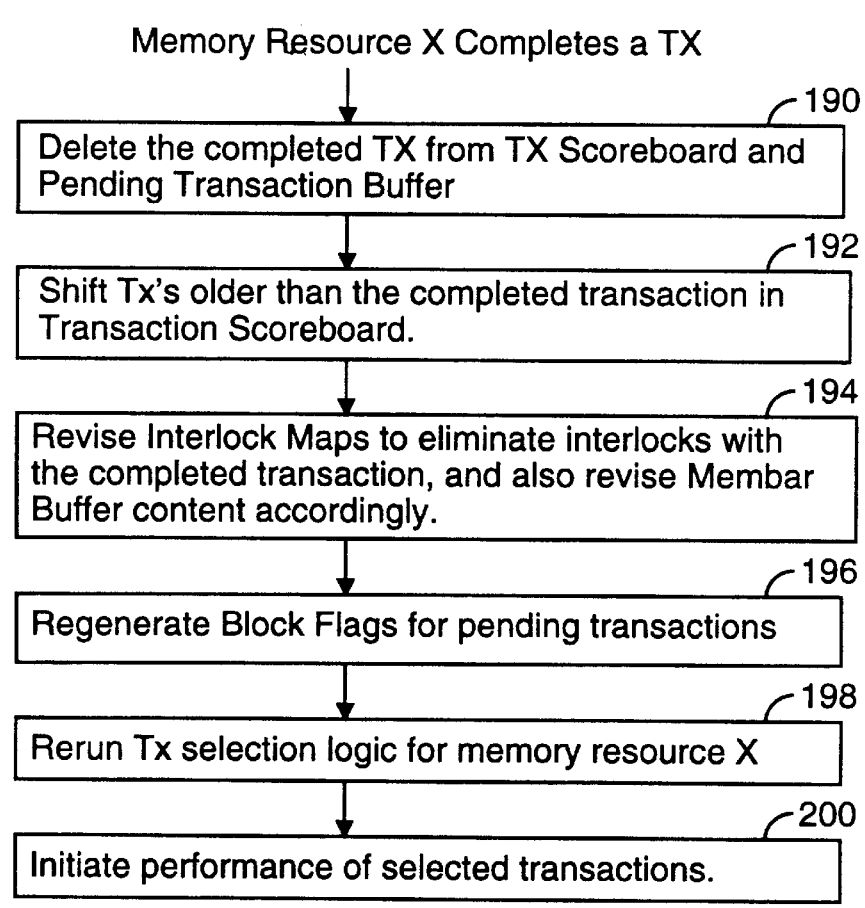
FIG. 7 is a flow chart of the operation of the memory controller, in response to the completion of a memory transaction, in an embodiment of the present invention.

Referring to FIG. 7, there is shown a flow chart representing the operation of a state machine in the interconnect and memory controller 114 that is used to select transactions for execution. Operation of this state machine is initiated each time a memory transaction is completed by any of the memory resources in the interconnect. The completed transaction is deleted from the transaction scoreboard and the appropriate pending transaction buffer (step 190). Then, if the completed transaction was not the oldest pending transaction, all the transactions older than the completed transaction are shifted up one position in the transaction scoreboard (step 192). In addition, the Interlock Maps of all transactions whose Interlock Maps referenced the completed transaction are updated by shifting the contents of those Interlock Maps so as to eliminate all interlocks with the completed transaction. In addition, the contents of the membar buffer 144 are revised accordingly (step 194). Next, the Block flags of all pending transactions are recomputed using the circuitry shown in FIG. 4 and are stored in the corresponding transaction scoreboard records (step 196). Finally, transaction selections are computed for any memory resources that are available for use (step 198) to see if any of the pending transactions can be serviced by the available memory resources, and performance of the selected transactions, if any, is initiated (step 200).

Alternate optimizations may be performed by implementing the transaction scoreboard 140 and the membar buffer 144 in an more efficient integrated structure.

Additional Considerations

Depending on the interconnect architecture cache miss operations due to load miss, store miss and other memory transactions defined above may be mapped to the following categories of interconnect transactions:

Read to share transactions may be caused by a load miss in the cache.

Read to own transactions may be caused by a store miss in the cache. Also, atomic operations performed in cache may be mapped to a Read to Own interconnection transaction.

Write Invalidate transactions may be generated due to a Flush operation, which is mapped to the store operation for memory model purposes.

Interrupt transactions may be mapped to a dedicated interconnect transaction of its own, but is mapped to the store operation for memory model purposes.

If a data processor does back to back RDS (read to share on load miss in processor's cache) transactions with the memory model set to TSO, the two transactions must be performed in program order—they cannot bypass each other in the global event ordering in the system. However, if the data processor issues back to back RDS transactions with its memory model set to RMO, then the two transactions can be performed in a different order than the program order.

Exporting memory model information to the interconnect allows the interconnect to vary the global event order of transactions from the program order.

An alternate mechanism for enforcing barrier instructions (called membar instructions above), other than the mechanism described above, is to have the interconnect delay acknowledging to the data processor receipt of the membar instruction until execution of the relevant pending transactions has been completed. Another mechanism for enforcing barrier instructions is for the data processor to revise the memory model information exported to the interconnect for the succeeding instructions to require sequential ordering with respect to the transactions prior to the barrier instruction. Yet another mechanism for enforcing barrier instructions is to have the processor block the export of any further transactions that are blocked by the barrier instruction until outstanding transactions to the interconnect are completed.

The interconnect memory transaction management method of the present invention also supports prefetch transactions, which are generally used to bring instructions or data into the data processor's cache earlier than needed so as to eliminate delays caused by cache misses. The memory models do not generally apply to prefetch transactions, because prefetches are mainly for "warming up" the cache. The affect of prefetch transactions is transparent to the correct performance of the software. Thus, to enable out of order execution of prefetch transactions, the data processor may indicate to the interconnect a memory model of RMO for all prefetch transactions.

Similarly, the writeback transactions can be exported to the interconnect with a memory model value of RMO. Writeback transactions can be performed in parallel, or reordered, with respect to the associated victimizing load (i.e., read) transaction and all prior transactions provided there is appropriate other logic to implement any coherency related issues due to this reordering.

Another type of transaction that is not within the purview of a memory model is interrupt transactions, which can be exported to the interconnect with a memory model value of RMO, preceded by a membar memsync instruction or other equivalent barrier instruction, so that they can be reordered as applicable by the interconnect.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

In data processors that do not support the PSO memory model, the memory model information exported to the interconnect will indicate one of the SSO, TSO, and RMO memory models. In data processors that support only the SSO and RMO memory models, only one bit of memory model information needs to be exported to the interconnect with each memory transaction request.

What is claimed is:

1. A method of managing memory transaction, comprising:

at a device external to a data processor, receiving from the data processor memory transaction requests, each memory transaction request having associated therewith a memory transaction ordering model selected from a predefined pluralityof memory transaction ordering models;

storing pending memory transaction data including a representation of pending memory transactions, comprising requested memory transactions not yet completed; the pending memory transaction data including memory transaction order data indicating which of the pending memory transactions can be performed before other ones of the pending memory transactions; and performing the pending memory transactions in an order consistent with the memory transaction order data, wherein a subset of the pending memory transactions are performed in a different order than they were received from the data processor.

2. The method of claim 1, the storing step including determining, based on the memory transaction ordering model associated with a most recently received memory transaction request and the memory transaction ordering model associated with at least one other pending memory transaction, whether or not the memory transaction associated with the most recently received memory transaction request can be performed before the at least one other pending memory transaction and storing a representation of the ordering determination in the memory transaction ordering data.

3. The method of claim 2, storing in a table precomputed memory transaction ordering determinations for predefined combinations of first and second memory transactions based on the memory transaction type and memory transaction ordering model associated with each of the first and second memory transactions;

wherein the ordering determination in the storing step is generated, at least in part, by a reading a precomputed memory transaction ordering determination from the table that corresponds to the memory transaction type and memory transaction ordering model associated with each of the most recently received and the other pending memory transactions.

4. The method of claim 2, storing in a table precomputed memory transaction ordering determinations for all possible combinations of first and second memory transactions based on the memory transaction type and memory transaction ordering model associated with each of the first and second memory transactions;

wherein the ordering determination in the storing step is generated, at least in part, by a reading a precomputed memory transaction ordering determination from the table that corresponds to the memory transaction type and memory transaction ordering model associated with each of the most recently received and the other pending memory transactions.

5. The method of claim 1, the storing step including determining, based on the memory transaction ordering model associated with a most recently received memory transaction request and the memory transaction ordering models associated with each of a plurality of other pending memory transactions, whether or not the memory transaction associated with the most recently received memory transaction request can be performed before each of the other pending memory transactions and storing a representation of the ordering determinations in the memory transaction ordering data.

6. The method of claim 1, the predefined plurality of memory transaction ordering models comprising a set of memory transaction ordering models selected from the set consisting essentially of SSO (strong sequential order), TSO (total store order), PSO (partial store order) and RMO (relaxed memory order).

7. The method of claim 1, wherein a subset of the memory transaction requests comprise prefetch transaction requests and interrupt transaction requests having associated therewith the RMO memory transaction ordering model, whereby the subset of the memory transaction requests can be reordered with respect to any prior outstanding memory transaction requests from the data processor.

8. The method of claim 1, wherein a subset of the memory transaction requests comprise interrupt transaction requests having associated therewith the RMO memory transaction ordering model preceded by a membar store-store instruction.

9. The method of claim 1, wherein a subset of the memory transaction requests comprise interrupt transactions requests having associated therewith the SSO memory transaction ordering model, wherein the interrupt transaction requests in the subset are not preceded by a membar transaction.

10. A memory controller for managing memory transactions requested by a data processor, comprising:

a port for receiving from the data processor memory transaction requests, each memory transaction request having associated therewith a memory transaction ordering model selected from a predefined plurality of memory transaction ordering models;

pending memory transaction storage, coupled to the port, for storing pending memory transaction data including a representation of pending memory transactions, comprising requested memory transactions not yet completed; the pending memory transaction data stored by the pending memory transaction storage including memory transaction order data indicating which of the pending memory transactions can be performed before other ones of the pending memory transactions; and transaction dispatch logic, coupled to the pending memory transaction storage, that controls order of performance of the pending memory transactions such that the order of performance is consistent with the memory transaction order data, wherein a subset of the pending memory transactions are performed in a different order than they were received from the data processor.

11. The memory controller of claim 10, interlock determination logic for determining, based on the memory transaction ordering model associated with a most recently received memory transaction request and the memory transaction ordering model associated with at least one other pending memory transaction, whether or not the memory transaction associated with the most recently received memory transaction request can be performed before the at least one other pending memory transaction, and for storing a representation of the ordering determination in the pending memory transaction storage as the memory transaction ordering data.

12. The memory controller of claim 11, the interlock determination logic coupled to stored table of precomputed memory transaction ordering determinations for predefined combinations of first and second memory transactions based on the memory transaction type and memory transaction ordering model associated with each of the first and second memory transactions;

the interlock determination including logic for reading a precomputed memory transaction ordering determination from the table that corresponds to the memory transaction type and memory transaction ordering model associated with each of the most recently received and the other pending memory transactions.

13. The memory controller of claim 11, the interlock determination logic coupled to a stored table of precomputed memory transaction ordering determinations for all possible combinations of first and second memory transactions based on the memory transaction type and memory transaction ordering model associated with each of the first and second memory transactions;

the interlock determination including logic for reading a precomputed memory transaction ordering determination from the table that corresponds to the memory transaction type and memory transaction ordering model associated with each of the most recently received and the other pending memory transactions.

14. The memory controller of claim 11, the interlock determination including logic for determining, based on the memory transaction ordering model associated with a most recently received memory transaction request and the memory transaction ordering models associated with each of a plurality of other pending memory transactions, whether or not the memory transaction associated with the most recently received memory transaction request can be performed before each of the other pending memory transactions and storing a representation of the ordering determinations in the pending memory transaction storage as the memory transaction ordering data.

15. The memory controller of claim 10, the predefined plurality of memory transaction ordering models comprising a set of memory transaction ordering models selected from the set consisting essentially of SSO (strong sequential order), TSO (total store order), PSO (partial store order) and RMO (relaxed memory order).

16. The memory controller of claim 10, wherein a subset of the memory transaction requests comprise prefetch transaction requests and interrupt transaction requests having associated therewith the RMO memory transaction ordering model, whereby the subset of the memory transaction requests can be reordered with respect to any prior outstanding memory transaction requests from the data processor.

17. The memory controller of claim 10, wherein a subset of the memory transaction requests comprise interrupt transaction requests having associated therewith the RMO memory transaction ordering model preceded by a membar store-store instruction.

18. The memory controller of claim 10, wherein a subset of the memory transaction requests comprise interrupt transactions requests having associated therewith the SSO memory transaction ordering model, wherein the interrupt transaction requests in the subset are not preceded by a membar transaction.

* * * * *